US009694551B2

(12) United States Patent
Marchini et al.

(10) Patent No.: US 9,694,551 B2
(45) Date of Patent: Jul. 4, 2017

(54) PROCESS AND APPARATUS FOR MANUFACTURING TYRES FOR VEHICLE WHEELS

(75) Inventors: Maurizio Marchini, Milan (IT); Christian De Col, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 763 days.

(21) Appl. No.: 13/884,805

(22) PCT Filed: Nov. 17, 2011

(86) PCT No.: PCT/IB2011/002747
§ 371 (c)(1),
(2), (4) Date: May 10, 2013

(87) PCT Pub. No.: WO2012/066415
PCT Pub. Date: May 24, 2012

(65) Prior Publication Data
US 2013/0220520 A1 Aug. 29, 2013

Related U.S. Application Data

(60) Provisional application No. 61/415,558, filed on Nov. 19, 2010.

(30) Foreign Application Priority Data

Nov. 18, 2010 (IT) .............................. MI2010A2137

(51) Int. Cl.
*B29D 30/30* (2006.01)
*B29D 30/08* (2006.01)
(Continued)

(52) U.S. Cl.
CPC .......... *B29D 30/08* (2013.01); *B29D 30/0016* (2013.01); *B29D 30/16* (2013.01);
(Continued)

(58) Field of Classification Search
CPC .............. B29D 30/1642; B29D 30/165; B29D 30/1657; B29D 30/3042; B29D 30/305;
(Continued)

(56) References Cited

U.S. PATENT DOCUMENTS 4,049,484 A * 9/1977 Priest ........................ B44C 1/16
156/285
5,240,299 A * 8/1993 Flavell ................... A41H 43/02
294/902

(Continued)

FOREIGN PATENT DOCUMENTS

EP 0 956 940 A1 11/1999
JP 2003-514695 4/2003
(Continued)

OTHER PUBLICATIONS

Notification of the First Office Action from the State Intellectual Property Office of the People's Republic of China, in counterpart Chinese Application No. 201180054174.0 (dated Jan. 27, 2015).
(Continued)

*Primary Examiner* — Geoffrey L Knable
(74) *Attorney, Agent, or Firm* — Finnegan, Henderson, Farabow, Garrett & Dunner, L.L.P.

(57) ABSTRACT

A process for manufacturing tires for vehicle wheels includes associating at least one reinforcing structure with at least one surface portion of at least one tire component laid on a forming support, wherein associating the at least one reinforcing structure includes bringing, through a handling and deposition member, at least one reinforcing element to the forming support and depositing, through said handling and deposition member, the reinforcing element on a respective deposition part defined on a surface portion of the component. The depositing includes gradually laying the
(Continued)

reinforcing element on the deposition part following the profile of the deposition part in a circumferential direction.

17 Claims, 5 Drawing Sheets

(51) Int. Cl.
  *B29D 30/00* (2006.01)
  *B29D 30/16* (2006.01)
  *B29D 30/70* (2006.01)
(52) U.S. Cl.
  CPC ......... *B29D 30/1657* (2013.01); *B29D 30/30* (2013.01); *B29D 30/305* (2013.01); *B29D 30/3057* (2013.01); *B29D 30/70* (2013.01); *B29D 2030/3092* (2013.01)
(58) Field of Classification Search
  CPC ................ B29D 30/3057; B29D 30/30; B29D 2030/1692; B29D 2030/3092
  See application file for complete search history.

(56) References Cited

U.S. PATENT DOCUMENTS

| | | | |
|---|---|---|---|
| 6,355,126 B1 * | 3/2002 | Ogawa | B29D 30/1657 156/117 |
| 2010/0200152 A1 | 8/2010 | Marchini et al. | |

FOREIGN PATENT DOCUMENTS

| | | |
|---|---|---|
| JP | 2003-251711 | 9/2003 |
| JP | 2005-510388 | 4/2005 |
| JP | 2009-148910 | 7/2009 |
| WO | WO 99/17920 | 4/1999 |
| WO | WO 2009/004396 A1 | 1/2009 |
| WO | WO 2009/033493 A1 | 3/2009 |
| WO | WO 2010/067139 | 6/2010 |

OTHER PUBLICATIONS

Notice of Reasons for Rejection from the Japanese Patent Office in counterpart Japanese Application No. 2013-539357 mailed Oct. 23, 2015.

* cited by examiner

PROCESS AND APPARATUS FOR MANUFACTURING TYRES FOR VEHICLE WHEELS

CROSS REFERENCE TO RELATED APPLICATIONS

This application is a national phase application based on PCT/IB2011/002747, filed Nov. 17, 2011, which claims the priority of Italian Patent Application No. MI2010A002137, filed Nov. 18, 2010, and claims the benefit of U.S. Provisional Application No. 61/415,558, filed Nov. 19, 2010, the content of each application being incorporated herein by reference.

BACKGROUND OF THE INVENTION

Field of the Invention

The present invention relates to a process and an apparatus for manufacturing tyres for vehicle wheels.

Description of the Related Art

A tyre for vehicle wheel generally comprises a carcass structure comprising at least one carcass ply comprised of reinforcing cords embedded in an elastomeric matrix. The carcass ply has end edges respectively engaged with annular anchoring structures. The latter are arranged in the areas of the tyre usually identified by the name of "beads" and each of them is normally formed by a substantially circumferential annular insert on which at least one filling insert is applied, in radially outer position thereof. Such annular inserts are commonly identified as "bead wires" and have the task of keeping the tyre firmly fixed to the anchoring seat specifically provided in the rim of the wheel, thus preventing, in operation, the radially inner end edge of the tyre coming out from such seat.

At the beads specific reinforcing structures may be provided having the function of improving the torque transmission to the tyre.

In a radially outer position with respect to the carcass ply a belt structure comprising one or more belt layers is associated, said belt layer being arranged radially one on top of the other and having textile or metal reinforcing cords with crossed orientation and/or an orientation substantially parallel to the direction of circumferential extension of the tyre.

Between the carcass structure and the belt structure a layer of elastomeric material, known as "under-belt", can be provided, said layer having the function of making the radially outer surface of the carcass structure as uniform as possible for the subsequent application of the belt structure.

In a radially outer position with respect to the belt structure a tread band is applied, also made of elastomeric material.

Between the tread band and the belt structure a so-called "under-layer" of elastomeric material can be arranged, said under-layer having properties suitable for ensuring a steady union of the tread band itself.

On the side surfaces of the carcass structure respective sidewalls of elastomeric material are also applied, each extending from one of the side edges of the tread band up to the respective annular anchoring structure to the beads.

The traditional processes for manufacturing tyres for vehicle wheels essentially provide for the components of the tyre listed above to be first made separately from one another, to be then assembled on a proper building drum.

However, the current trend is to use manufacturing processes that allow minimising or, if possible, eliminating the manufacturing and storage of semi-finished parts.

Attention is thus now turned towards process solutions which allow making the single components of the tyre being formed by directly building them, according to a predetermined sequence, on a forming support, typically toroidal or cylindrical.

Throughout the present description and in the following claims, the term "reinforcing element" is used to indicate an element cut to size from a continuous reinforced band-like element fed close to a forming support of the tyre and comprising one or more thread-like reinforcing elements such as textile or metal cords which are substantially parallel to one another and embedded in a matrix of elastomeric material, or coated with a layer of elastomeric material.

The term: "elastomeric material", is used to indicate a composition comprising at least one elastomeric polymer and at least one reinforcing filler. Preferably, such composition further comprises additives such as, for example, a cross-linking agent and/or a plasticizer. Thanks to the provision of the cross-linking agent, such material may be cross-linked by heating, so as to make the end product.

Throughout the present description and in following claims, the terms "radial" and "axial" and the expressions "radially inner/outer" and "axially inner/outer" are used with reference to the radial direction and to the axial direction of a forming support used for building a specific component of the tyre. The terms "circumferential" and "circumferentially" instead, are used referring to the annular extension of the forming support.

Throughout the present description and in the following claims, with "gradual laying of" a reinforcing element or with "gradually laying" a reinforcing element a non-simultaneous depositing of the entire reinforcing element on the deposition surface is meant. More specifically, a deposition carried out over an extended period of time, involving even larger portions of the element to be laid on and of the deposition surface as time passes is meant. For example, if the deposition of the reinforcing element starts at time t0=0, that is there is a first contact between the latter and the deposition surface, at time t1 comprised between about 0.05 s and about 0.1 sec. the laid area of the reinforcing element will be equal to about 50% of the area of the same and at time t2 comprised between about 0.1 sec. and about 0.2 sec. the reinforcing element will be completely laid on the deposition surface.

Throughout the present description and in the following claims, "thin plate element" or "thin plate" is used to indicate an element having a negligible thickness compared to the longitudinal and cross dimensions thereof. Preferably, the size of such thickness if of at least one order of magnitude smaller than the longitudinal and cross dimensions. Even more preferably, the size of such thickness if of at least two orders of magnitude smaller than the longitudinal and cross dimensions. For example, in the case of a longitudinal dimension comprised between about 150 mm and about 250 mm and of a cross dimension comprised between about 50 mm and about 150 mm, the thickness will be comprised between about 0.1 mm and about 1 mm.

In the present description and in the following claims, "component" of the tyre is used to indicate any part of the tyre suitable for carrying out a function or a portion thereof. Such component may for example be the liner, the under-liner, the abrasion-proof element, the bead core, the bead filler, the carcass ply, the belt strip, the belt under-layer, the tread band under-layer, the sidewall inserts, the sidewalls, the tread band, the reinforcing inserts.

WO 2010/067139 describes a process for manufacturing tyres for vehicle wheels, wherein an annular reinforcing structure is associated at each of the axially opposite end edges of a carcass ply laid on a substantially cylindrical forming support, such annular reinforcing structure being obtained by deposition on the carcass ply of a plurality of reinforcing elements cut to size from a continuous reinforced band-like element fed close to the forming support. The deposition of the reinforcing element comprises the positioning of the reinforcing element on the end edge of the carcass ply by moving a special positioning member and after that, the complete laying of the reinforcing element on the end edge by exerting a pressure with a proper pressing member separate from the positioning member. Such pressing member is provided with a plurality of spring elements.

SUMMARY OF THE INVENTION

The Applicant observed that in a process of the type described above the deposition of the reinforcing element on the end edge of the carcass ply requires the arrangement and movement of two separate mechanical members: the positioning member and the pressing member. Such members are moved separately from each other in subsequent time periods.

The Applicant noted that the use of multiple mechanical members movable separately causes an unavoidable waste of time in the operations for the assembly of the apparatus and the setup of the production process, as it is necessary to pay special attention to both the positioning of said mechanical members relative to the forming support and to the synchronisation of the movements thereof.

The Applicant also observed that a pressing member of the type described above cannot guarantee an even and precise laying of the reinforcing element on the deposition surface. This is due to the possible different elastic behaviour of the single spring elements constituting the above pressing member.

The Applicant perceived that it is possible to achieve a significant saving of time in the operations of assembly of the apparatus and setup of the production process by using a single mechanical member for both the positioning of the reinforcing element on the deposition surface and the subsequent complete laying of said reinforcing element on said deposition surface.

In this respect, the Applicant also envisaged the need of ensuring an even and precise laying of the reinforcing element on the end edge of the carcass ply.

Finally, the Applicant found that such need is fully met if said mechanical member, after having positioned the reinforcing element on the deposition surface, carries out a gradual laying of the reinforcing element on said deposition surface following the profile in circumferential direction of the specific surface deposition part whereon the reinforcing element is intended to be laid on.

Therefore, in a first aspect thereof, the present invention relates to a process for manufacturing tyres for vehicle wheels, comprising associating at least one reinforcing structure with at least one surface portion of at least one tyre component laid on a forming support, wherein associating said at least one reinforcing structure comprises:
 bringing, through a handling and deposition member, at least one reinforcing element to said forming support;
 depositing, through said handling and deposition member, said at least one reinforcing element on a respective deposition part defined on at least one surface portion of said at least one component;
 wherein said depositing comprises gradually laying said at least one reinforcing element on said deposition part following the profile of said deposition part in a circumferential direction.

The Applicant believes that the entire operation of deposition of the reinforcing element is carried out by a single mechanical element, which first positions the reinforcing element on the deposition surface and then completely lays the reinforcing element on a respective deposition part of said deposition surface. An advantageous reduction of the time for assembling the apparatus and setting up the production is thus obtained, compared to the processes of the type described in WO 2010/067139, wherein the entire deposition operation requires the use of two separate mechanical members.

The Applicant further believes that, advantageously, the laying of the reinforcing element on the respective deposition part takes place following the profile of said deposition part in the circumferential direction. An optimal laying of the reinforcing element on the deposition part is thus obtained, whatever the actual pattern of the surface of said deposition part in the circumferential direction is.

In a second aspect thereof, the present invention relates to an apparatus for manufacturing tyres for vehicle wheels, comprising:
 a forming support;
 a handling and deposition member for handling said at least one reinforcing element up to said forming support and depositing said at least one reinforcing element on a respective deposition part defined on at least one surface portion of at least one tyre component laid on said forming support;
 wherein said handling and deposition member comprises at least one thin plate element adapted to interact with said at least one reinforcing element, said at least one thin plate element being flexible at least in a circumferential direction.

The Applicant believes that the use of a thin plate element which is flexible in the circumferential direction allows circumferentially deforming the reinforcing element while perfectly matching the circumferential profile of the deposition part, thus obtaining the desired accuracy and evenness of deposition.

The present invention, in at least one of the above aspects thereof, can have at least one of the following preferred features.

Preferably, the action of gradually laying is carried out starting from a central portion of the reinforcing element up to the opposite end portions thereof. The laying of the reinforcing element is thus symmetrical in the circumferential direction with respect to a radial plane that intersects the reinforcing element at the central portion thereof. This implies clear advantages in terms of deposition evenness of every single reinforcing element.

In the preferred embodiments of the present invention, the action of gradually laying comprises:
 positioning said central portion of said at least one reinforcing element on said deposition part;
 depositing the remaining portion of said at least one reinforcing element on said deposition part.

Preferably, the action of depositing the remaining portion of said at least one reinforcing element is obtained in reaction to a predetermined thrust action exerted on said deposition part at said central portion of said at least one reinforcing element after said central portion has been positioned. The complete deposition of the reinforcing element is therefore advantageously obtained through a single thrust action exerted only on the central portion of the reinforcing element, that is without any need of providing specific thrust members acting on the opposite end portions of the reinforcing element.

Preferably, the action of depositing the remaining portion of said at least one reinforcing element comprises bending said remaining portion along at least one first predetermined direction. It is thus possible to deform the reinforcing element so that it can perfectly match the profile of the deposition surface along said first predetermined direction.

In the preferred embodiments of the invention, said at least one first predetermined direction is inclined by a predetermined angle with respect to said circumferential direction. Such inclination is substantially due to the fact that the deposition of the reinforcing element in the circumferential direction takes place while the handling and deposition member is oriented in a non circumferential direction. This results from the particular orientation taken by the reinforcing element with respect to the handling and deposition member when said reinforcing element is picked up by said handling and deposition member.

In particularly preferred embodiments of the present invention, the action of depositing the remaining portion of said at least one reinforcing element comprises bending said remaining portion along at least one second predetermined direction. It is thus possible to deform the reinforcing element so that it can perfectly match the profile of the deposition surface along said second predetermined direction.

Preferably, said at least one second predetermined direction is orthogonal to said first predetermined direction. Advantageously, the desired bending of the reinforcing element in the circumferential direction is therefore obtained as a combined effect of the bending of the reinforcing element along said two orthogonal directions. In practice, thanks to a bending deformation of the reinforcing element along said two orthogonal directions, which is adapted to allow the reinforcing element to match the profile of the deposition surface along said orthogonal directions, the desired bending deformation is obtained in the circumferential direction, which is adapted to allow the reinforcing element to match the profile of the deposition surface along said circumferential direction. An advantageous combined deformation effect is also obtained in the axial direction, so that the reinforcing element can also match the profile of the deposition surface along said axial direction.

Preferably, the present invention comprises, after said at least one reinforcing element has been deposited, rotating said forming support by a predetermined angle about a rotation axis thereof and pressing said at least one reinforcing element against said deposition part during such rotation. Such pressure action produces an advantageous compaction/sticking of the reinforcing element on the deposition surface.

In preferred embodiments of the present invention, said at least one component is at least one carcass ply.

According to a preferred embodiment of the present invention, associating said at least one reinforcing structure comprises:
    feeding a continuous reinforced band-like element close to said forming support;
    cutting said continuous reinforced band-like element to form at least one reinforcing element.

Preferably, said at least one thin plate element comprises a thin plate of harmonic steel. Advantageously, such thin plate is provided with the desired flexibility features, which are required for suitably deforming the reinforcing element.

In the preferred embodiments of the present invention, said at least one thin plate element is flexible along a first predetermined direction with respect to said circumferential direction. It is thus possible to obtain the bending deformation of the reinforcing element along said first predetermined direction.

In particularly preferred embodiments of the present invention, said at least one thin plate element is flexible along a second predetermined direction orthogonal to said first predetermined direction. It is thus possible to obtain the bending deformation of the reinforcing element along said second predetermined direction and, consequently, the desired bending deformation in the circumferential and axial directions.

Preferably, said handling and deposition member comprises an articulated arm movable with respect to said forming support and a support member of said at least one thin plate element pivotally mounted on said articulated arm.

Preferably, said handling and deposition member is movable between a first operating position wherein said at least one thin plate element is in a non-deformed configuration and a second operating position wherein said at least one thin plate element is in a deformed configuration according to the profile of said deposition part in the circumferential direction.

Preferably, said handling and deposition member comprises a holding device of said at least one reinforcing element. Such device ensures a steady grip of the reinforcing element and the holding of the reinforcing element into position during the movement thereof towards the deposition surface.

Preferably, said holding device comprises a plurality of magnetic elements.

According to a different preferred embodiment of the present invention, said holding device comprises a suction device or a suction cup device.

In preferred embodiments of the present invention, said handling and deposition member comprises two thin plate elements symmetrically arranged at opposite sides with respect to said holding device. Advantageously, the reinforcing element is therefore held by the handling and deposition member at the central portion thereof (that is, at the part adapted to be positioned on the deposition surface), while it is stressed to bending on opposite sides with respect to said central portion (that is, at the parts adapted to gradually lay on the deposition surface). It is thus possible to achieve both the effective holding of the reinforcing element during the movement thereof towards the deposition surface and the gradual bending deformation of the reinforcing element during the laying thereof on the deposition surface.

Preferably, the present invention comprises a spherical hinge operatively interposed between each thin plate element and said support member.

Advantageously, said spherical hinge gives high freedom of movement to the distal end portion of each thin plate element in any direction, allowing in this specific case the thin plate element (and thus the reinforcing element held thereby) to suitably deform for matching the profile of the deposition surface in the circumferential and axial directions.

Preferably, the present invention comprises a sliding block operatively interposed between each thin plate element and said support member. Advantageously, said sliding block allows a relative shifting between each thin plate element and the support member in the circumferential direction; such shifting is required for ensuring an optimal deformation of each thin plate element in the circumferential direction.

In preferred embodiments of the present invention, said handling and deposition member comprises at least one element of elastomeric material associated with said at least one thin plate element at a surface thereof which is operatively faced to said forming support. Advantageously, said element of elastomeric material, while deforming, contributes to the gradual laying of the reinforcing element on the deposition surface and at the same time it allows absorbing any unevenness in the deposition profile both in the circumferential direction and in the axial direction, to the advantage of the deposition evenness of the reinforcing element.

Preferably, said handling and deposition member comprises two elements of elastomeric material, each associated with a respective thin plate element.

Preferably, said at least one element of elastomeric material has a thickness comprised between about 1 mm and about 20 mm.

More preferably, said thickness is comprised between about 4 mm and about 10 mm. Advantageously, said thickness values are suitable for obtaining an optimal compromise between weight and deformability.

Preferably, said at least one element of elastomeric material comprises an end portion and a remaining portion shaped as a V or U. Advantageously, the Applicant has found that such a configuration allows operating with reinforcing elements having cutting angles (and thus longitudinal extension) even very different from one another, limiting as much as possible the elastomeric material (thus to the advantage of weight and deformability of such material).

In a preferred embodiment of the present invention, there are provided:
 a feeding device of a continuous reinforced band-like element close to said forming support;
 a cutting unit of the continuous reinforced band-like element to form at least one reinforcing element.

Preferably, said cutting unit defines a cutting angle comprised between about 15° and about 90°.

Even more preferably, said cutting unit defines a cutting angle comprised between about 22° and about 45°.

Advantageously, the present invention may be carried out with reinforcing elements having cutting angle values very different from one another, starting from relatively low values. Since the smaller the cutting angle the larger the longitudinal extension of the reinforcing element is, the width being equal, this implies that the present invention may be carried out with reinforcing elements having length values very different from one another, relatively large angle values being comprised.

In particularly preferred embodiments thereof, the present invention comprises at least one idle roller movable perpendicularly to a rotation axis of the forming support. The action of such roller produces an advantageous compaction/sticking of the reinforcing element on the deposition surface.

Preferably, said forming support is substantially cylindrical.

BRIEF DESCRIPTION OF THE DRAWINGS

Further features and advantages of the present invention will appear more clearly from the following detailed description of some preferred embodiments of an apparatus and process according to the present invention, made with reference to the annexed drawings. In such drawings.

DETAILED DESCRIPTION OF THE INVENTION

Figure 1:
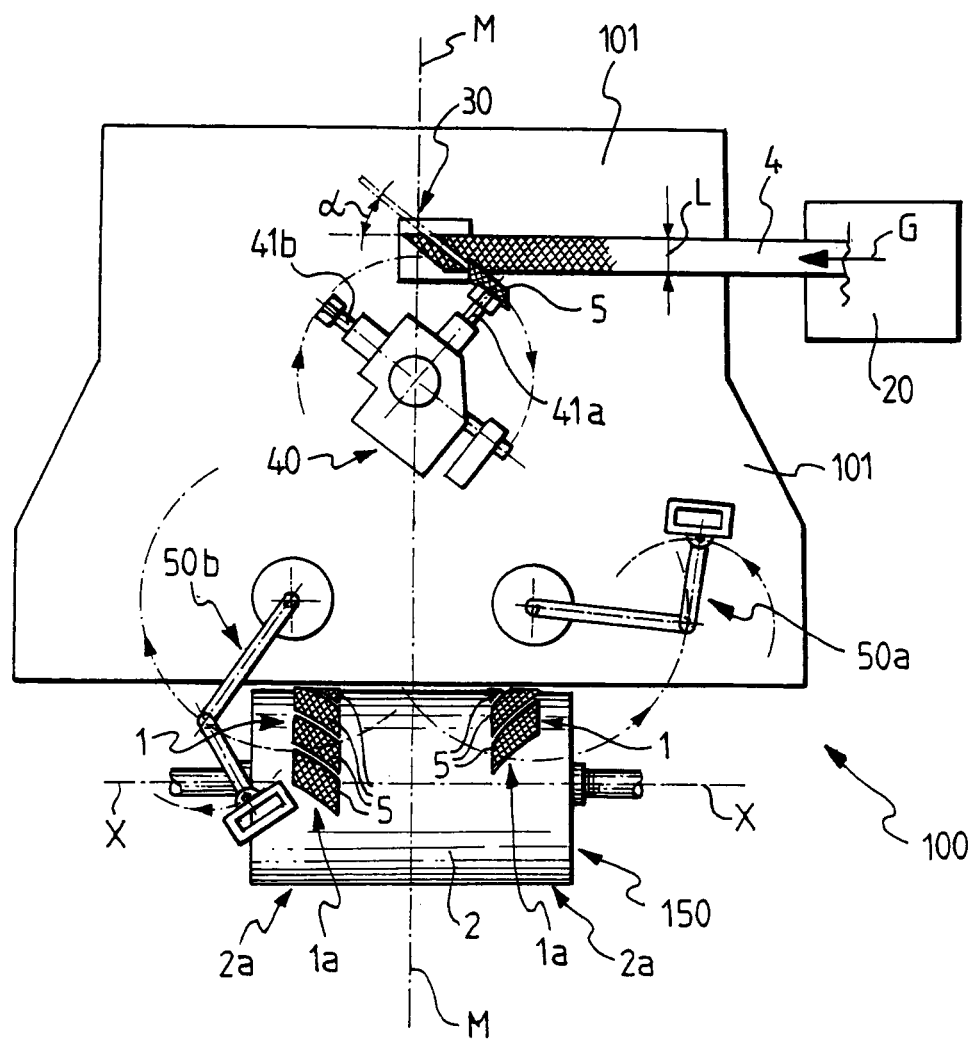
FIG. 1 is a simplified schematic plan view of an apparatus for manufacturing a tyre for vehicle wheels according to the present invention, such apparatus being in an operating configuration.

In FIG. 1, reference numeral 100 globally indicates an exemplary embodiment of an apparatus for manufacturing a tyre for vehicle wheels according to the present invention.

Preferably, apparatus 100 may be used, in a process for manufacturing a tyre for vehicle wheels, for building a carcass ply. Such building comprises the arrangement of an annular reinforcing structure 1 at each end edge 2a of a carcass ply 2 previously laid on a forming support 150 which is preferably cylindrical. The above end edges 2a are defined at axial end zones of ply 2 adapted to define the bead region of the tyre.

The reinforcing structure 1 therefore is conveniently formed directly on the forming support 150. It is defined by a predetermined number of reinforcing elements 5, of same length and width, laid one after the other on respective parts of a portion 1a of deposition surface defined on the opposite end edges 2a of the carcass ply 2 and extended in the circumferential direction. FIG. 1 shows a reinforcing structure 1 while it is formed at each end edge 2a of the carcass ply 2.

In the apparatus 100 according to the present invention, the positioning and the subsequent complete laying of the reinforcing element are carried out by a single mechanical member, illustrated in detail in FIGS. 2-5 and described hereinafter.

In FIGS. 2-5, the bending radius of the forming support 150 and the size in the circumferential direction of the reinforcing element 5 (and of the relative mechanical member supporting it) have been intentionally altered for higher clarity of the description relating to the deposition of the reinforcing element 5 on the carcass ply 2 laid on the forming support 150.

In order to allow the subsequent laying in circumferential direction of the reinforcing elements 5, the forming support 150 is periodically controlled in rotation about the axis of rotation X-X thereof by an angle corresponding to a predetermined circumferential step.

The reinforcing elements 5 are preferably obtained by cut to size operations of at least one continuous reinforced band-like element 4 extended along a longitudinal extension direction indicated in FIG. 1 with G.

The continuous reinforced band-like element 4 has a defined and constant width L, preferably comprised between 1 and 100 mm, more preferably between 30 and 70 mm.

The continuous reinforced band-like element 4 preferably comprises a plurality of reinforcing cords (not shown in the figures) of metal or textile material embedded in a matrix of elastomeric material or coated by a layer of elastomeric material. Such reinforcing cords extend parallel to one another along the longitudinal extension direction G of the continuous reinforced band-like element 4.

The continuous reinforced band-like element 4 is fed along the longitudinal extension direction G thereof by a feeding device 20, which is illustrated in FIG. 1 in a totally schematic manner. The feeding takes place with a predetermined pre-advance step, such step defining the cutting length of the continuous reinforced band-like element 4, which corresponds to the width of the reinforcing elements 5 when laid on the forming support 150.

Downstream of the feeding device 20, with reference to the advance direction of the continuous reinforced band-like element 4, there is provided a cutting unit 30 suitable for carrying out the sequential operations of cutting to size the continuous reinforced band-like element 4 for obtaining in a sequence the reinforcing elements 5. The cutting unit 30 acts on the continuous reinforced band-like element 4, with a predetermined cutting frequency, along a cutting direction that on the lying plane of the continuous reinforced band-like element 4, defines a predetermined cutting angle $\alpha$ with the longitudinal extension direction G of the continuous reinforced band-like element 4.

In the preferred embodiments of the present invention, the cutting angle $\alpha$ is set to a value greater than zero, preferably comprised between about 15° and about 90°, more preferably between about 20° and about 50°, even more preferably between about 22° and about 45°.

When the cutting angle $\alpha$ is equal to 90°, the length of the reinforcing elements 5 laid on the forming support 150 corresponds to the width of the continuous reinforced band-like element 4. When the cutting angle $\alpha$ is smaller than 90°, the length of the reinforcing elements 5 is equal to the width of the continuous reinforced band-like element 4 divided the sine of angle $\alpha$. Preferably, the length of the reinforcing elements 5 is in any case comprised between 1 mm and 100 mm, more preferably between 30 mm and 70 mm.

Downstream of the cutting unit 30, that is between the cutting unit 30 and the forming support 150, a pick up device 40 of the reinforcing elements 5 is provided. Such a pick up device 40 comprises a pair of arms 41a, 41b adapted to alternatively pick up the reinforcing element 5 just formed to move it towards the forming support 150.

Apparatus 100 further comprises, between the pick up device 40 and the forming support 150, a pair of handling members 50a, 50b, each adapted to pick up a respective reinforcing element 5 from a respective arm 41a, 41b of the pick up device 40 after such arm has made a predetermined angular movement (preferably by 90°) starting from the cutting unit 30.

The handling members 50a, 50b (which are absolutely identical to one another) are preferably arranged symmetrically at opposite sides with respect to the centre line plane M of apparatus 100 and are moved synchronously with arms 41a, 41b. Each reinforcing element 5 is thus transferred by a respective arm 41a, 41b of the pick up device 40 to a respective handling and deposition member 50a, 50b, which then lays it on a respective part of the portion 1a of the deposition surface, as better described hereinafter.

In the present description only one of said handling and deposition members (herein indicated with reference numeral 50a) is described in detail, it being understood that what said also applies to the other handling and deposition member 50b.

Figure 2:
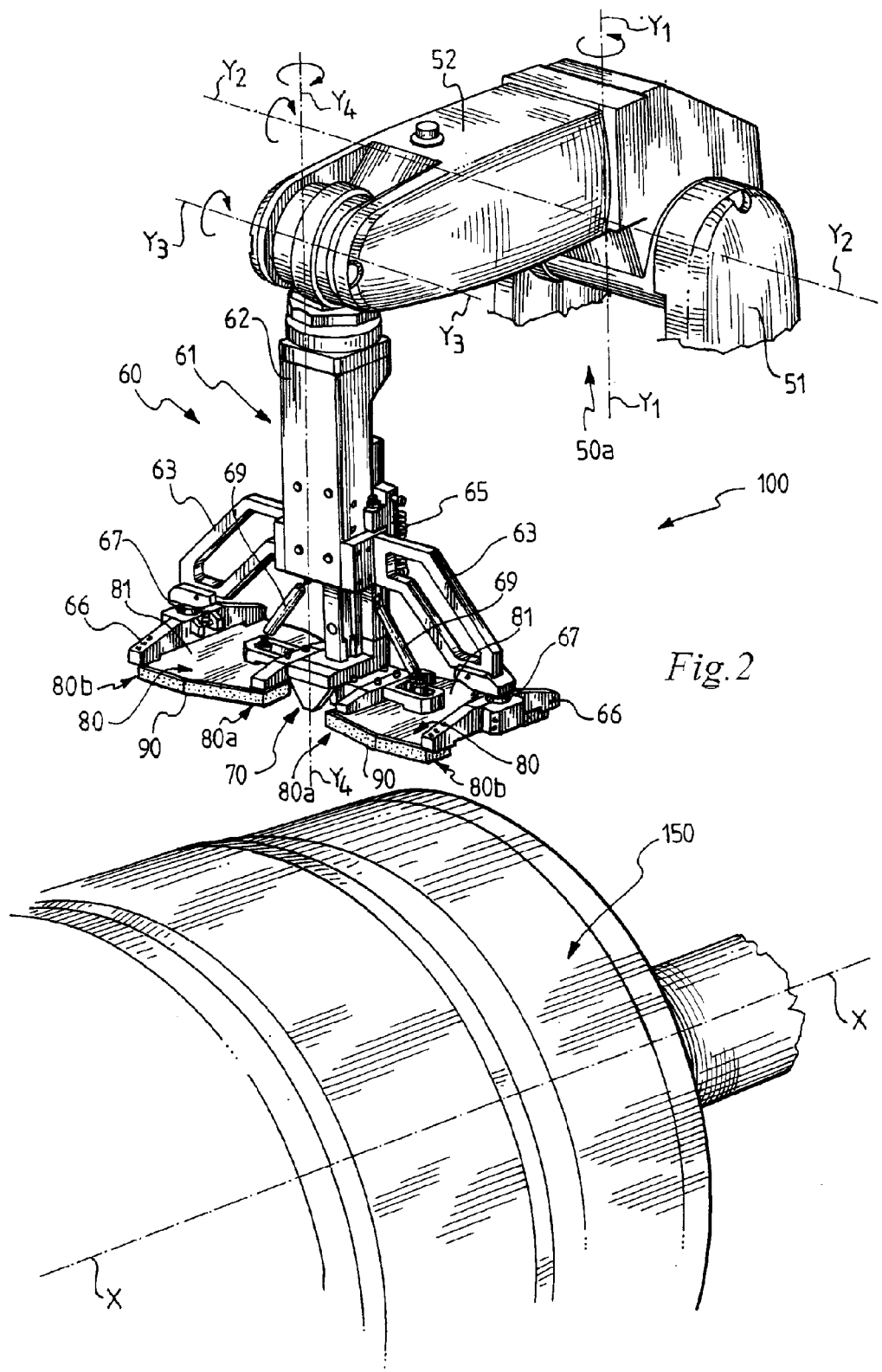
FIG. 2 is an enlarged and partly cutaway perspective view of a portion of the apparatus of FIG. 1 in a non operating configuration.

As illustrated in detail in FIG. 2, the handling and deposition member 50a is defined by an articulated arm comprising a first vertical arm element 51 pivoted on a base 101 (FIG. 1) of apparatus 100 at a vertical pivoting arm $Y_1$ and a second arm element 52 pivoted to the arm element 51 at a horizontal pivoting axis $Y_2$ defined on a top end portion of arm 51.

The handling and deposition member 50a further comprises a deposition member 60 pivoted at a horizontal pivoting axis $Y_3$ defined at a free end of the second arm element 52 opposite that of pivoting to the first arm element 51.

As shown in FIGS. 2-5, the deposition member 60 comprises a support member 61 which in turn comprises a first central upright 62 pivotally mounted about a pivoting axis $Y_4$ perpendicular to the pivoting axis $Y_3$.

Two brackets 63 are symmetrically arranged at opposite sides with respect to the first upright 62, each bracket 63 being integrally associated with a free end of the first upright 62 opposite that of pivoting to the arm element 52.

On the first upright 62 sliding guides (not visible) extending parallel to the pivoting axis $Y_4$ are provided. A second upright 64 is slidingly mounted on such guides. In operation, the deposition member 60 is oriented relative to the forming support 150 so that, subsequent to a thrust action exerted by the handling and deposition member 50a (and thus by the first upright 62) against the forming support 150, the second upright 64 may slide relative to the first upright 62 on said sliding guides along a direction perpendicular to the rotation axis X-X of the forming support 150.

The second upright 64 is associated with each of brackets 63 through a respective elastic element 65 which, in the specific case illustrated herein, consists of a tension spring.

Figure 3:
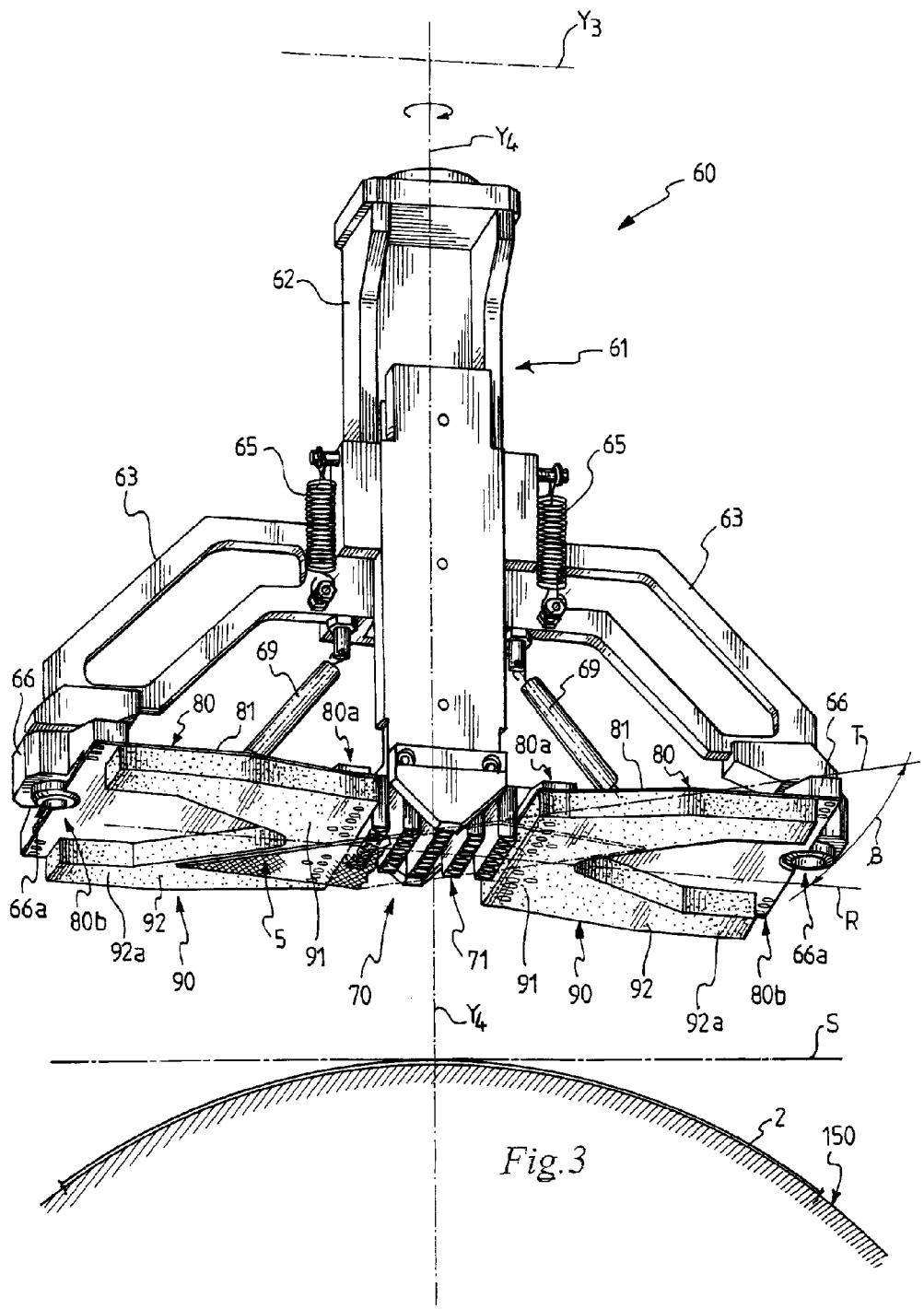
FIG. 3 is a perspective bottom view of a detail of the portion of FIG. 2.

As shown in FIG. 3, at the distal end of the second upright 64 relative to axis $Y_3$ a holding device 70 of the reinforcing element 5 is associated, said holding device 70 facing the forming support 150. Thanks to such device 70 the reinforcing element 5 is prevented from falling once picked up by arm 41a, 41b of the pick up device 40, during the movement thereof towards the forming support 150.

Figure 4:
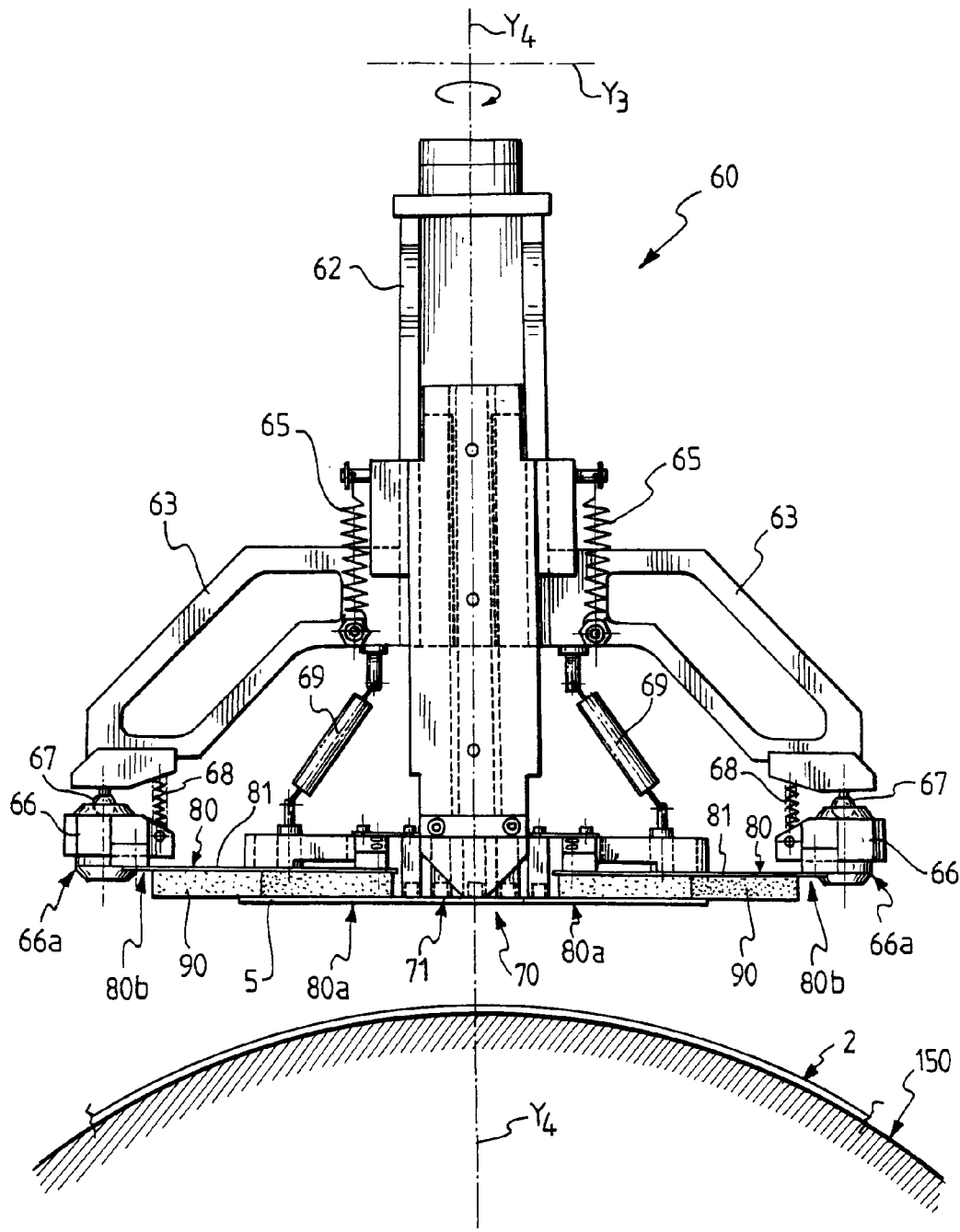
FIG. 4 is an orthogonal view of the portion of apparatus of FIG. 2 in a first operating configuration.
Figure 5:
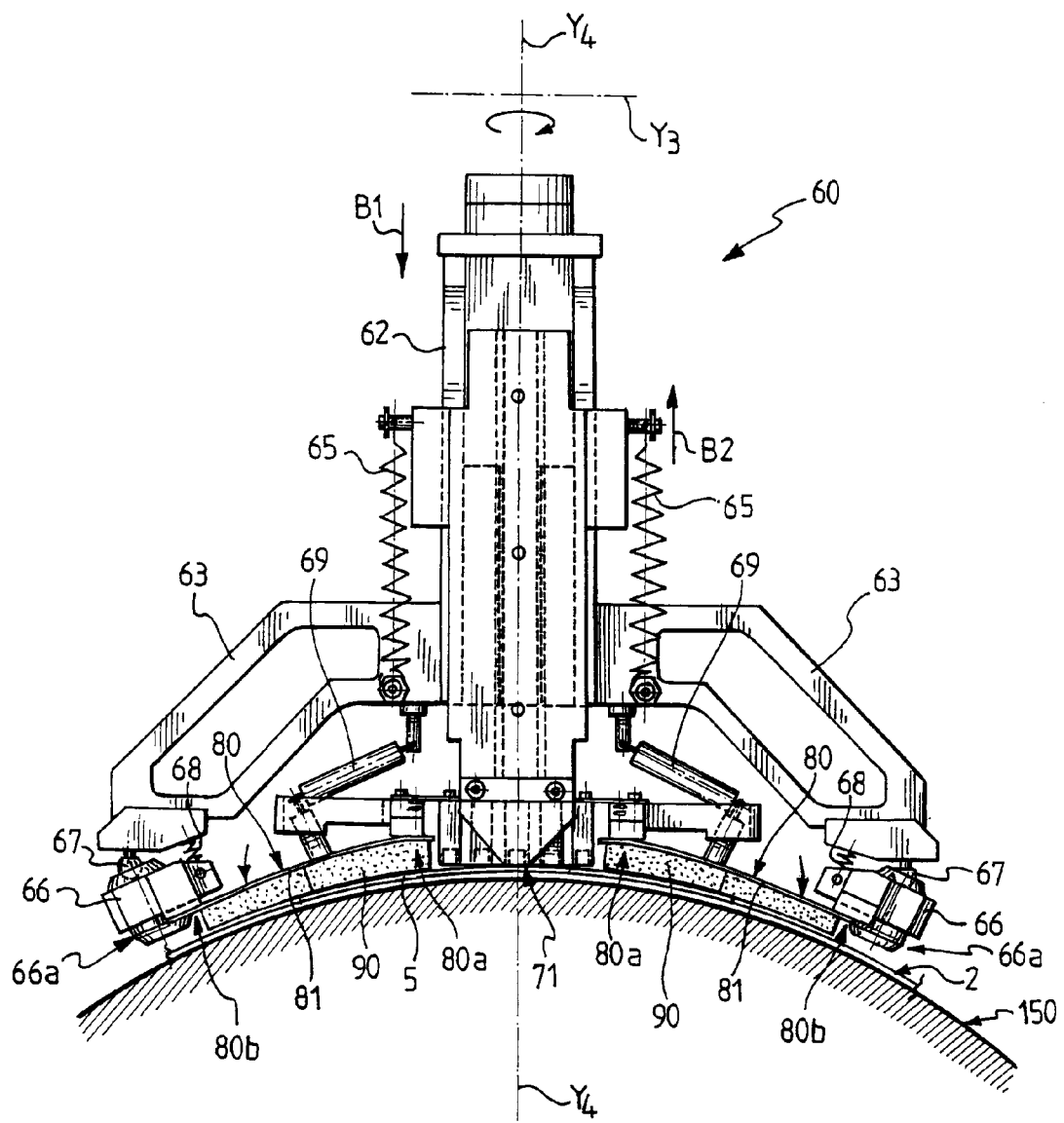
FIG. 5 is an orthogonal view of the portion of apparatus of FIG. 2 in a second operating configuration.

In the specific embodiment illustrated herein, the cords provided within the reinforcing element 5 are metal cords and the holding device 70 comprises a plurality of magnetic elements arranged on parallel rows (only one of these rows is indicated with reference numeral 71 in FIGS. 3-5) adapted to magnetically interact with said metal cords thus preventing the reinforcing element 5 from falling during the movement towards the forming support 150.

In an alternative embodiment not shown, the cords provided within the reinforcing element 5 are of textile material and the holding device comprises a suction device or suction cup device.

The deposition member 60 further comprises a pair of thin plate elements 80 each being associated, at a first free end 80a thereof, with the holding device 70 and at an opposite free end 80b thereof, to the free end of a respective bracket 63.

Each thin plate element 80 preferably consists of a thin plate 81 of harmonic steel having a thickness preferably comprised between 0.1 mm and 3 mm, more preferably comprised between 0.3 mm and 1 mm.

Said thin plate element 80 is flexible in any direction. In particular, as shall be better described hereinafter, the thin plate element 80 is deformed to bending, by the effect of the thrust action exerted by the handling and deposition member 50a, along two orthogonal directions inclined by a predetermined angle with respect to the circumferential direction. Said bending deformations produce a bending deformation along the circumferential direction.

The coupling between the free end 80a of each thin plate element 80 and the holding device 70 is of the firm type, that is, such as not to allow relative movements. The coupling between the opposite free end 80*b* of each thin plate element 80 and the free end of the respective bracket 63, on the other hand, is of the non firm type, that is, such as to allow relative movements.

In particular, the free end 80*b* of each thin plate element 80 is associated to a support member 66 which in turn is associated with the free end of the respective bracket 63 (FIGS. 2, 4 and 5). As well shown in FIGS. 4 and 5, between each support member 66 and the free end of the respective bracket 63 a spherical hinge 67 and a spring 68 are provided. The spherical hinge 67 allows a freedom of movement to the support member 66 in the three axes, whereas the spring 68 limits the extent of such movement based on the value of the elastic constant thereof.

The coupling between free end 80*b* of each thin plate element 80 and respective support member 66 comprises a sliding block 66*a*. Such block ensures the possibility of relative sliding between the free end 80*b* of the thin plate element 80 and the support member 66 in the longitudinal direction of the thin plate element 80.

Each thin plate element 80 is further associated, at a body portion defined between the opposite ends 80*a*, 80*b*, with a respective bracket 63, through a spring 69 for ensuring a fixed position at rest of the thin plate element 80.

As clearly shown in FIGS. 4 and 5, the second upright 64 is capable of sliding on the first upright 62 for moving between a rest position, shown in FIG. 4, wherein the thin plate elements 80 are in a non deformed configuration, and an operating position, shown in FIG. 5, wherein the thin plate elements 80 are deformed according to the circumferential profile of the forming support 150. As shall be better explained hereinafter, such deformation takes place after the deposition member 60 is moved in abutment against the forming support 150, by the effect of the reaction exerted by the forming support 150 to a thrust action exerted by the handling and deposition member 50*a* against the forming support 150.

An element 90 of elastomeric material is associated with the bottom surface of each thin plate element 80 (that is, on the surface that in operation is facing the forming support 150). Such element 90 preferably has a thickness comprised between about 1 mm and about 20 mm, more preferably between about 4 mm and about 10 mm.

As well shown in FIG. 3, each element 90 comprises an end portion 91 arranged at the end portion 80*a* of the respective thin plate element. Such end portion 91 has a substantially rectangular shape in plan. The remaining portion 92 of each element 90 is shaped as a V or U and at each branch of the V or U it has a respective free end portion 92*a* having a rectangular shape in plan.

Apparatus 100 further comprises a pair of idle rollers (not shown in the figures) movable perpendicularly to the rotation axis (X-X) of the forming support 150. Such rollers are coated with a deformable material and are arranged at opposite sides with respect to the centre line plane M of apparatus 100, each one in the proximity of a respective handling and deposition member 50*a*, 50*b*.

As better described hereinafter, the above rollers are adapted to be activated when the reinforcing structure 1 has been completed at each end edge 2*a* of the carcass ply 2 laid on the forming support 150, for improving the compaction and the adhesion of said reinforcing structure 1 on the respective end edge 2*a* of the carcass ply 2.

With reference to FIGS. 1-5, a preferred embodiment of the process carried out by apparatus 100 described above shall now be described. In such process, the positioning and the subsequent complete laying of the reinforcing element 5 are carried out only by the articulated arm comprising the handling and deposition member 50*a* (and 50*b*), and the deposition member 60.

Before starting the above process, the forming support 150 is mounted on frame 101 and apparatus 100 is set up according to the features of the tyre to be made. The apparatus setup comprises the positioning of the cutting unit 30 at the desired cutting angle α relative to the longitudinal direction G of the continuous reinforced band-like element 4.

As described above, in the above process the reinforcing elements 5 are made in a sequence from the continuous reinforced band-like element 4 and alternately laid each on a respective end edge 2*a* of the carcass ply 2. In particular, the laying of a reinforcing element 5 on an end edge 2*a* takes place immediately after another reinforcing element 5 has been laid on the other end edge 2 and vice versa, so as to make a reinforcing structure 1 on an end edge 2*a* while another reinforcing structure 1 is being made on the other end edge 2*a*.

At the normal condition, therefore, there is a situation wherein at least one reinforcing element 5 has already been laid on one end edge 2*a* and at least another reinforcing element 5 has already been laid on the other end edge 2*a*. Such situation is shown in FIG. 1.

For simplicity of description, forming of a reinforcing structure 1 at one of the end edges 2*a* of the carcass ply 2 shall be described hereinafter, it being understood that forming of the other reinforcing structure 1 at the other end edge 2*a* of the carcass ply 2 takes place in a totally similar manner.

The continuous reinforced band-like element 4 is made to advance by a predetermined step along the above longitudinal direction G. During such advance, the pick up device 40 is made to rotate so as to bring arm 41*a* at the cutting unit 30. In this position, arm 41*a* is activated to pick up a free end of the continuous reinforced band-like element 4.

At the same time as the rotation of the pick up 40, a synchronous rotation of the handling members 50*a* and 50*b* takes place.

Afterwards, the cutting which obtains the reinforcing element 5 from the continuous reinforced band-like element (4) is carried out.

As shown in FIG. 1, the reinforcing element 5 just made is moved by the pick up device 40 by about 90° to then transfer it to the handling and deposition member 50*a*, which in the meantime moves towards the pick up device 40.

Afterwards, arm 41*a* of the pick up device 40 transfers the previously cut reinforcing element 5 to the handling and deposition member 50*a*.

After having picked up the reinforcing element 5, the handling and deposition member 50*a* rotates about axis $Y_1$ to bring the above reinforcing element 5 to the end edge 2*a* of the carcass ply 2. During such rotation, the reinforcing element 5 is held into position by the holding device 70, as shown in FIG. 3.

Meanwhile, the forming support 150 is made to rotate by a predetermined angle corresponding to a movement in the circumferential direction by a portion of length equal to (if the circumferentially consecutive reinforcing elements 5 must be laid in contact and without overlapping) or greater than (if the reinforcing elements 5 must be laid leaving a free space between two circumferentially consecutive reinforcing elements) the pre-advance step of the continuous reinforced band-like element 4.

FIG. 3 shows the particular orientation of the reinforcing element 5 with respect to the thin plate elements 80.

In particular, it is first seen that the shape of elements 90 of elastomeric material is such as to ensure in any case contact with the reinforcing element 5 on the entire surface of the latter. This ensures an even thrust action on the entire surface above during the deposition of the reinforcing element 5 on the carcass ply 2.

Moreover, again in FIG. 3 it is seen that a side of the reinforcing element 5 is oriented along a direction T inclined by a predetermined angle β with respect to the longitudinal direction R of the thin plate elements 80. As a result, in order to lay the reinforcing element 5 so that the aforementioned side is oriented along the circumferential direction of the forming support 150, the deposition member 60 shall be oriented with respect to the forming support 150 so that the longitudinal direction R of the thin plate elements 80 is inclined by angle β with respect to plane extension S of the circumferential direction of the forming support 150.

Once the handling and deposition member 50a is in a radially external position with respect to the forming support 150, it moves towards the forming support 150 (and thus in a direction perpendicular to the rotation axis X-X of the forming support 150) up to preferably positioning a central portion of the reinforcing element 5 on a respective end edge 2a of the carcass ply 2.

Afterwards, the handling and deposition member 50a exerts a predetermined thrust action (arrow B1 in FIG. 5) against the forming support 150 at said central portion of the reinforcing element 5. The reaction exerted by the forming support 150 to said thrust action causes a movement of the second upright 64 away from the forming support (arrow B2 in FIG. 5). In turn, such movement causes a bending deformation of the thin plate elements 80 according to the circumferential profile of the part of the surface of carcass ply 2 whereon said thin plate elements 80 are pressed. Finally, a gradual laying of the reinforcing element 5 on the carcass ply 2 is thus obtained; such gradual laying preferably starts at the central portion of the reinforcing element 5 and continues affecting always different portions of the reinforcing element 5 up to affecting the opposite free ends of said element.

Because of the particular position taken by the thin plate elements 80 with respect to the forming support 150, a bending deformation of the reinforcing element 5 is obtained both along a direction inclined by angle β with respect to the plane extension S of the circumferential direction R of the forming support 150, and along a direction orthogonal to said direction R. The combined effect of said bending deformations generates the desired bending deformation of the reinforcing element 5 in the circumferential direction.

The process described above is repeated cyclically through the handling and deposition members 50a and 50b, each time laying a new reinforcing element 5 up to completing the reinforcing structures 1 on both end edges 2a of the carcass ply 2.

Afterwards, each one of the idle rollers described above is brought in contact with the respective reinforcing structure 1 just formed. The rotation of the forming support 150 is then activated for at least one full revolution. The action of the rollers during such rotation produces the compaction of the reinforcing structures 1 on the respective end edges 2a of the carcass ply 2.

Of course, a man skilled in the art may make further changes and variants to the invention described hereinbefore in order to meet specific and contigent application requirements, these changes and variants in any case falling within the scope of protection defined by the following claims.

The invention claimed is:

1. An apparatus for manufacturing a tyre for a vehicle wheel, comprising:
an annular forming support; and
a handling and deposition member for handling at least one reinforcing element up to said annular forming support and depositing said at least one reinforcing element on a respective deposition part defined on at least one surface portion of at least one tyre component laid on said annular forming support, wherein said handling and deposition member comprises a holding device configured for engaging and holding said at least one reinforcing element at a central portion thereof, and two thin plate elements symmetrically arranged at opposite sides with respect to said holding device and adapted to interact with said at least one reinforcing element, each of said thin plate elements being flexible at least in a circumferential direction of the annular forming support, and each of said thin plate elements being coupled at a first free end to one of the opposite sides of the holding device such that no relative movement is allowed between the first free ends of the thin plate elements and the holding device, the handling and deposition member being configured so that the depositing comprises gradually laying said at least one reinforcing element on the respective deposition part starting from said central portion of said at least one reinforcing element held by said holding device.

2. The apparatus according to claim 1, wherein each of said thin plate elements comprises a thin plate made of harmonic steel.

3. The apparatus according to claim 1, wherein said thin plate elements are each flexible along a first predetermined direction with respect to said circumferential direction.

4. The apparatus according to claim 3, wherein said thin plate elements are each flexible along a second predetermined direction orthogonal to said first predetermined direction.

5. The apparatus according to claim 1, wherein said handling and deposition member comprises an articulated arm movable with respect to said annular forming support and a support member of said thin plate elements having a first end pivotally mounted on said articulated arm.

6. The apparatus according to claim 5, wherein said holding device is supported at a second end of said support member opposite to said first end.

7. The apparatus according to claim 6, wherein said holding device comprises a plurality of magnetic elements.

8. The apparatus according to claim 5, comprising a spherical hinge operatively interposed between each thin plate element and said support member.

9. The apparatus according to claim 5, comprising a sliding block operatively interposed between each thin plate element and said support member.

10. The apparatus according to claim 1, wherein said handling and deposition member is movable between a first operating position wherein said thin plate elements are in a non-deformed configuration and a second operating position wherein said thin plate elements are in a deformed configuration according to a profile of said deposition part in the circumferential direction.

11. The apparatus according to claim 1, wherein said handling and deposition member comprises at least one element of elastomeric material between each of said thin plate elements and a reinforcing element at a surface of the thin plate element which is operatively faced to said forming support.

12. The apparatus according to claim 11, wherein said at least one element of elastomeric material has a thickness between about 1 mm and about 20 mm.

13. The apparatus according to claim 11, wherein said at least one element of elastomeric material comprises an end portion and a remaining portion shaped as a V or U.

14. The apparatus according to claim 1, wherein said forming support is substantially cylindrical.

15. The apparatus according to claim 1, comprising:
   a feeding device of a continuous reinforced band-like element close to said forming support; and
   a cutting unit of the continuous reinforced band-like element to form at least one reinforcing element.

16. The apparatus according to claim 15, wherein said cutting unit is configured to cut the band-like element at a cutting angle between about 15° and about 90° relative to a longitudinal extension direction of the band-like element.

17. The apparatus according to claim 15, wherein said cutting unit is configured to cut the band-like element at a cutting angle between about 22° and about 45° relative to a longitudinal extension direction of the band-like element.

\* \* \* \* \*